(12) United States Patent
Yang et al.

(10) Patent No.: US 12,479,941 B2
(45) Date of Patent: Nov. 25, 2025

(54) PREPARATION METHOD OF BOPP FILM STIFFENING AGENT

(71) Applicant: Henghe Materials & Science Technology Co., Ltd., Zhejiang (CN)

(72) Inventors: Meng Jun Yang, Zhejiang (CN); Bin Wang, Zhejiang (CN); Xiang Dong Sun, Zhejiang (CN)

(73) Assignee: Henghe Materials & Science Technology Co., Ltd., Zhejiang (CN)

( * ) Notice: Subject to any disclaimer, the term of this patent is extended or adjusted under 35 U.S.C. 154(b) by 134 days.

(21) Appl. No.: 18/031,011

(22) PCT Filed: Jun. 30, 2022

(86) PCT No.: PCT/CN2022/102706
§ 371 (c)(1),
(2) Date: Apr. 10, 2023

(87) PCT Pub. No.: WO2023/040415
PCT Pub. Date: Mar. 23, 2023

(65) Prior Publication Data
US 2023/0374181 A1    Nov. 23, 2023

(30) Foreign Application Priority Data
Sep. 17, 2021  (CN) .......................... 202111096393.7

(51) Int. Cl.
C08F 232/06  (2006.01)
C08F 2/06    (2006.01)
C08F 6/00    (2006.01)
C08F 8/04    (2006.01)
C08L 23/12   (2006.01)

(52) U.S. Cl.
CPC .............. *C08F 232/06* (2013.01); *C08F 2/06* (2013.01); *C08F 6/003* (2013.01); *C08F 8/04* (2013.01); *C08L 23/12* (2013.01)

(58) Field of Classification Search
CPC .. C08F 232/06; C08F 4/78; C08F 4/80; C08F 6/003
See application file for complete search history.

(56) References Cited

U.S. PATENT DOCUMENTS

2021/0189038 A1*  6/2021  Liu ........................ C09J 145/00

FOREIGN PATENT DOCUMENTS

| CN | 103087401 | 5/2013 |
| CN | 106313838 | 1/2017 |
| CN | 108715070 | 10/2018 |
| CN | 111971314 | 11/2020 |

OTHER PUBLICATIONS

"International Search Report (Form PCT/ISA/210) of PCT/CN2022/102706", mailed on Aug. 31, 2022, with English translation thereof, pp. 1-4.

* cited by examiner

*Primary Examiner* — Christopher M Rodd
(74) *Attorney, Agent, or Firm* — JCIPRNET

(57) ABSTRACT

The present invention relates to a preparation method of a BOPP film stiffening agent, including: taking cyclopentadiene or a derivative thereof and a norbornene monomer or C8 cycloolefin as a polymerization raw material, obtaining a polymerization resin liquid by continuous high-temperature polymerization, then preparing high-softening-point aliphatic hydrogenation petroleum resin through two-stage catalytic hydrogenation reaction and removing low-boiling-point light components and solvents; and then obtaining the BOPP film stiffening agent by mixing and extruding with homo-polypropylene. The stiffening agent prepared by the present invention has a very good anti-dissolution performance and environmental protection performance which is suitable for modification of a BOPP cigarette film, and has good market application prospects.

10 Claims, 1 Drawing Sheet

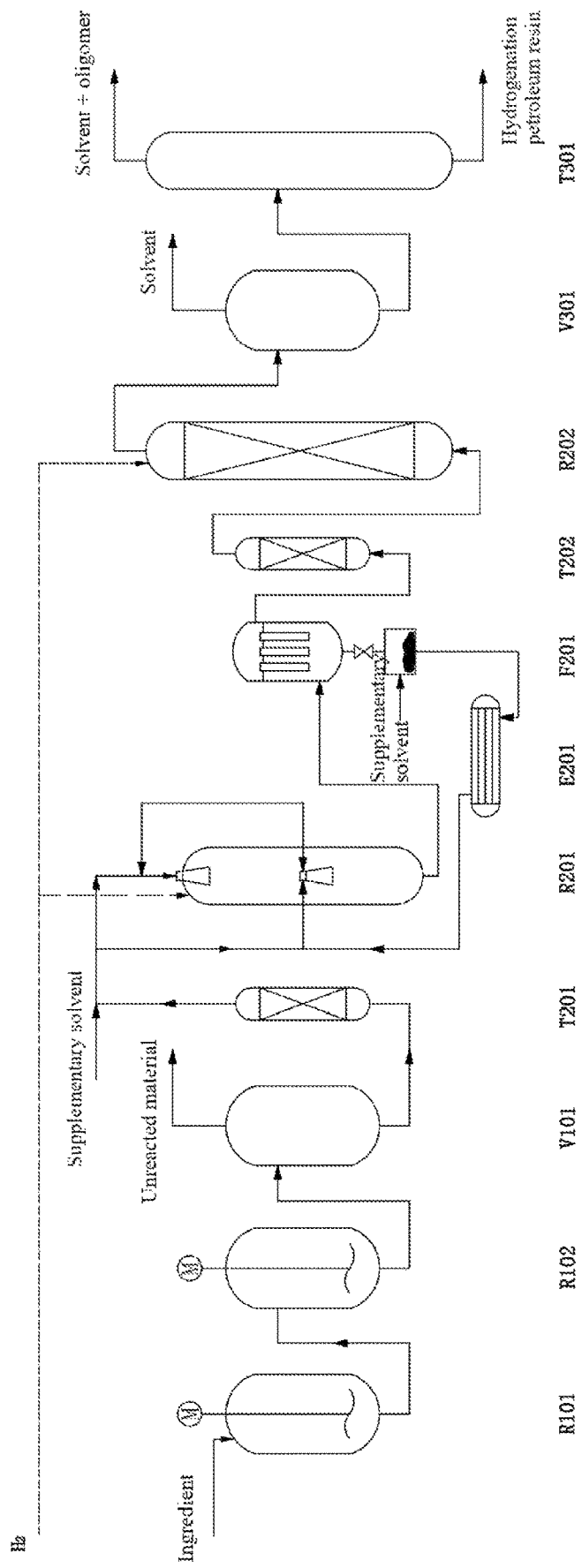

PREPARATION METHOD OF BOPP FILM STIFFENING AGENT

CROSS-REFERENCE TO RELATED APPLICATION

This application is a 371 application of International PCT application serial no. PCT/CN2022/102706 filed on Jun. 30, 2022, which claims the priority benefit of China application no. 202111096393.7, filed on Sep. 17, 2021. The entirety of each of the above mentioned patent applications is hereby incorporated by reference herein and made a part of this specification.

TECHNICAL FIELD

The present invention belongs to the technical field of film materials, and particularly relates to a preparation method of a BOPP film stiffening agent.

DESCRIPTION OF RELATED ART

A BOPP cigarette film, also known as biaxially oriented polypropylene cigarette film and cigarette film for short, is co-extruded and stretched by a variety of polypropylene functional materials. At present, domestic manufacturers generally use a three-layer (A/B/C) co-extrusion technology to prepare a high-performance BOPP cigarette film through biaxial stretching. It is colorless, odorless, tasteless, and non-toxic, has a certain blocking function to odor and moisture, and has a high tensile strength, an impact strength, rigidity, toughness, luster and good transparency. Therefore, it is an ideal material for cigarette packaging.

In an extrusion process of a middle layer of the BOPP cigarette film, it usually needs to add 10-20% of a stiffening agent, so as to increase an elastic modulus of the film, and improve thermal shrinkage, transparency, glossiness and the like; and at the same time, a processing temperature can be reduced, an extensibility and film-forming property of PP is improved, and it usually is a fine processing mixture with hydrogenated C5 or C9 petroleum resin as a main material. In patent CN103087401A, the number of parts by weight of petroleum resin in a polypropylene resin composition for preparing a packaging film is 10-30 parts, which is required to be C5 or C9 fraction or a mixture of a by-product obtained by petroleum cracking, preferably cyclopentadiene type petroleum resin or petroleum resin with cyclopentadiene type as a main component. In patent CN108715070A, an effective component of master batch of a stiffening agent selected for a core layer of a wrinkle and cigarette-packet-deformation resistant BOPP film is C9 hydrogenated resin with a high Vickers softening point of 180-185° C., which ensures the stiffness of the film and the shrinkage required for packaging. However, at the same time, an instant shrinkage rate is difficult to control and fluctuates greatly, and packaging shrinkage is severe. In patent CN106313838A, in a preparation method of a high-transparency cigarette film, dried materials of a lower surface layer, an intermediate core layer and an upper surface layer are respectively sent to a corresponding extruder for melting and mixing, wherein a composition of the intermediate core layer is 85-90% of homo-polypropylene and 10-15% of a stiffening agent according to a mass ratio.

It can be seen from the above patents that a main component of a stiffening agent adopted by a core layer of the BOPP cigarette film is usually petroleum resin with C5 fraction or C9 fraction as a raw material, which is generally cyclopentadiene type resin with a high softening point, a good environmental protection performance and similar polarity to PP. However, the above patents are only for an injection molding technology of the BOPP film stiffening agent, and there is basically no introduction to a preparation process of such resin.

A patent CN111971314A discloses high-temperature polymerization of at least one cyclodiene component and at least one olefinic unsaturated aromatic component, and the preparation of hydrocarbon resin through hydrogenation of a nickel catalyst. The present invention mainly introduces petroleum resin into a six membered ring structure by using an aromatic component as a comonomer, so as to improve its modification effect in paint, plastics, rubber and other products.

SUMMARY

The technical problem to be solved by the present invention is to provide a preparation method of a BOPP film stiffening agent. The prepared stiffening agent has a very good anti-dissolution performance and environmental protection performance, which is suitable for modification of a BOPP cigarette film, and has good market application prospects.

The present invention provides a preparation method of a BOPP film stiffening agent, including:

(1) mixing cyclopentadiene or a derivative thereof with a norbornene monomer or C8 cycloolefin uniformly according to a mass ratio of 1:(0.1-0.5) as a polymerization raw material, and then adding polyether polyol with 0.05-5.0% of a total material mass; and first, putting a reaction solvent accounting for 30-60% of the total material mass into a stirred high-pressure reactor (R101), performing a polymerization reaction at 220-250° C. for 10-20 h, and then performing the polymerization reaction in a stirred high-pressure reactor (R102) at 240-270° C. for 10-20 h to obtain a polymerization liquid;

(2) removing unreacted raw materials from the polymerization liquid obtained in step (1) in a flash tank at a pressure of 0.07-0.08 MPa and a temperature of 70-75° C.; and after passing through an adsorption packing tower, mixing the materials with a supplementary solvent and transporting to a loop hydrogenation reactor; and subjecting the materials to a reaction with $H_2$ at 140-180° C. under an action of a powder nickel-supported catalyst with a liquid hourly space velocity of 0.3-0.5 $h^{-1}$, and obtaining a mixture of a hydrogenation resin liquid A and a catalyst;

(3) throwing the mixture obtained in step (2) into a filter, separating the powder nickel-supported catalyst from a bottom, transporting a material at a top to a packing tower, and after adsorbing and removing impurities, throwing the materials into a hydrogenation reactor, subjecting the same to a reaction with $H_2$ at 190-240° C. under an action of a Ni—Mo/$\gamma$-$Al_2O_3$ catalyst with a liquid hourly space velocity of 2-5 $h^{-1}$, and obtaining a hydrogenation resin liquid B; and mixing the removed powder nickel-supported catalyst with the supplementary solvent, and then heating to 130-160° C. by a heat exchanger before returning to the loop hydrogenation reactor;

(4) transporting the hydrogenation resin liquid B obtained in step (3) to a flash tank, removing a solvent at a vacuum degree of −0.085 MPa to −0.095 MPa and a temperature of 200-250° C., transporting a hydrogenation resin liquid C obtained at a bottom to a distillation tower, removing low-boiling-point light components and residual solvents by distillation at the vacuum degree of −0.085 MPa to −0.095 MPa and the temperature of 200-250° C., and obtaining high-softening-point aliphatic hydrogenation petroleum resin at a tower bottom; and (5) extruding the high-softening-point aliphatic hydrogenation petroleum resin obtained in step (4) and homo-polypropylene by a twin-screw extruder according to a mass ratio of 1:1, at the same time, adding an antioxidant, and then obtaining the BOPP film stiffening agent by granulation and cooling.

The cyclopentadiene or the derivative thereof in step (1) is one or a mixture of the cyclopentadiene, methyl cyclopentadiene, ethyl cyclopentadiene, dicyclopentadiene and methyl cyclopentadiene dimer.

The norbornene monomer in step (1) is one or a mixture of 2,5-norbornadiene and 5-ethylene-2-norbornene; and the C8 cycloolefin is one or a mixture of 5-vinyl-2-cyclohexene and 1,3-cyclohexadiene.

The polyether polyol in step (1) is propylene glycol polyether (PPG) or polytetrahydrofuran glycol (PTHF).

The reaction solvent in step (1) is one or more of cyclohexane, methyl cyclohexane, cyclopentane and hydrogenated naphthenic oil.

The supplementary solvent in steps (2) and (3) is heavy hydrogenated naphthenic oil. A density of the heavy hydrogenated naphthenic oil is 0.91-0.93 g/cm$^3$, a kinematic viscosity thereof is 20-85 cSt, and an aniline point is 72-80° C.

A packing specification of the adsorption packing tower in step (2) is an upper layer being α-aluminium oxide and a lower layer being foam ceramics, and an average diameter of packing is 13-25 mm.

A content of Ni in the powder nickel-supported catalyst in step (2) is 60-70%, a carrier is silica, an average particle size is 15-50 μm, and a specific surface area is 150-220 m$^2$/g.

The Ni—Mo/γ-Al$_2$O$_3$ catalyst in step (3) is prepared by an impregnation method, a loading content of Ni is 15-35%, a loading content of Mo is 1-3%, and a size is Φ5×(4-6) mm.

Packing of the packing tower in step (3) adopts foam ceramics, and an average diameter of the packing is 13-25 mm.

A softening point of the high-softening-point aliphatic hydrogenation petroleum resin obtained in step (4) is 120-160° C., a Gardner color number is ≤1 #, a Z average molecular weight Mz=750-2300, and Mw/Mn is ≤1.8.

The specification of homo-polypropylene in step (5) is film grade, a melt flow rate (MI) is 4-10 g/10 min, a shrinking percentage is 1.5-2.0%, and Rockwell hardness is 76-78.

A setting temperature of the twin-screw extruder in step (5) is 250-260° C., and a melt temperature is 235-245° C.

The antioxidant in step (5) is an antioxidant BHT, and an added amount is 0.3%-0.4% of the total material mass.

A tensile elastic modulus of the BOPP stiffening agent obtained in step (5) is 1000-2500 Mpa, and the content of a volatile organic compound (VOC) is 2 g/L.

Beneficial Effects (1) In the present invention, nonaromatic cyclic monomers such as the norbornene monomer and the C8 cycloolefin are copolymerized with the cyclopentadiene (CPD) or the derivative thereof, which can adjust the polymer activity, improve the degree of polymerization of the cyclopentadiene and the derivative thereof, and obtain alicyclic petroleum resin with a high softening point and narrow molecular weight distribution by two-stage hydrogenation process, and it has a high softening point and molecular rigidity, and can be used for BOPP stiffening modification;

(2) in the present invention, a small amount of polyether polyol is adopted as a reaction raw material to adjust the polarity of liquid materials, the production of gel compounds is prevented, and the self polymerization of methyl cyclopentadiene is reduced;

(3) in the present invention, different nickel catalysts are used, and a two-stage hydrogenation catalytic process is adopted to obtain fully hydrogenated petroleum resin, which has excellent light and thermal resistant stability and environmental protection performance;

(4) in the present invention, the first-stage hydrogenation adopts a loop hydrogenation reactor process to enhance a resin hydrogenation efficiency, improve a product conversion rate and reduce a catalyst cost at the same time;

(5) in the present invention, Ni—Mo/γ-Al$_2$O$_3$ fixed-bed catalyst is adopted as catalyst of the second-stage hydrogenation, which has good hydrogenation selectivity, and is suitable for deep hydrogenation of alicyclic resin; and (6) in the present invention, a great amount of oligomers are removed through a decompression flash-distillation process, so as to obtain the BOPP cigarette film stiffening agent with low dissolution and low volatile organic compound (VOC) after blending the hydrogenation petroleum resin and the homo-polypropylene.

BRIEF DESCRIPTION OF THE DRAWINGS

FIGURE is a schematic flow chart of a process of the present invention.

DESCRIPTION OF THE EMBODIMENTS

The present invention is further described below in conjunction with specific embodiments. It should be understood that these embodiments are only used to explain the present invention and not to limit the scope of the present invention. In addition, it should be understood that those skilled in the art can make various changes or modifications to the present invention after reading contents taught in the present invention. These equivalent forms also fall within the scope defined in the claims attached to the present application.

Stiffness is a key performance to measure the quality of a BOPP cigarette film. The film formed by PP injection molding alone is usually soft, which cannot meet use requirements of the cigarette film. Therefore, during injection molding of the cigarette film, a stiffening modifier will be added to a core layer. The stiffness of the BOPP cigarette film is judged by testing a tensile elastic modulus (E, a stiffness index) according to the *Determination of Tensile Properties of Plastics—Part 3: Test Conditions for Thin Plastics and Sheets* (GB/T 1040.3-2006).

An anti-dissolution index of the BOPP cigarette film is mainly judged by measuring the volatile organic compound (VOC) content of a material at a high temperature, and determined by a method specified in the standard GB/T 23986-2009.

Embodiment 1

(1) Cyclopentadiene or a derivative thereof is mixed with a norbornene monomer or C8 cycloolefin uniformly according to a mass ratio of 1:0.2 as a polymerization raw material, and then PPG with 0.5% of a total material mass is added, first, methyl cyclohexane accounting for 50% of the total material mass is put into a stirred high-pressure reactor R101, a polymerization reaction is performed at 235° C. for 12 h, and then the polymerization reaction is performed in a stirred high-pressure reactor R102 at 240° C. for 12 h to obtain a polymerization liquid.

(2) Unreacted raw materials are removed from the above polymerization liquid in a flash tank V101 at a pressure of 0.075 MPa and a temperature of 73° C., after passing through an adsorption packing tower T201, a supplementary heavy hydrogenated naphthenic oil is mixed and transported to a loop hydrogenation reactor R201, it reacts with $H_2$ at 160° C. under an action of a powder nickel-supported catalyst with a liquid hourly space velocity of 0.33 $h^{-1}$, and a mixture of a hydrogenation resin liquid A and a catalyst is obtained.

(3) The above mixture passes through a filter F201, the powder nickel-supported catalyst is separated from a bottom, a material at a top is transported to a packing tower T202, after adsorbing and removing impurities such as catalyst powder, it enters a hydrogenation reactor R202, and reacts with $H_2$ at 1220° C. under an action of a Ni—Mo/γ-$Al_2O_3$ catalyst with a liquid hourly space velocity of 2 $h^{-1}$, and a hydrogenation resin liquid B is obtained. The powder nickel-supported catalyst removed by the filter F201 is mixed with the supplementary heavy hydrogenated naphthenic oil, and then heated to 160° C. by a heat exchanger E201 before returning to the R201.

(4) The above hydrogenation resin liquid B is transported to a flash tank V301, a solvent is removed by flashing at a vacuum degree of −0.085 MPa and a temperature of 215° C., a hydrogenation resin liquid C obtained at a bottom is transported to a distillation tower T301, then low-boiling-point light components and residual solvents are removed by distillation at the vacuum degree of −0.085 MPa and the temperature of 245° C., and high-softening-point aliphatic hydrogenation petroleum resin with a softening point of 136° C., Gardner color number of 0.3 #, Mz=1250, and Mw/Mn=1.45 is obtained at a tower bottom.

(5) The high-softening-point aliphatic hydrogenation petroleum resin obtained above and the homo-polypropylene are extruded by a twin-screw extruder according to a mass ratio of 1:1, at the same time, an antioxidant BHT with about 0.3% of a total material mass is added, and then the BOPP film stiffening agent with a tensile elastic modulus of 1750 MPa and volatile organic compound (VOC) of 0.5 g/L is obtained by granulation and cooling.

Embodiments 2-6

Embodiments 2-6 only adjust the mutual proportions of CPD, NBDE and PPG, and other process conditions are the same as those of Embodiment 1, that is, the effects of different ingredients on the performance of the hydrogenation petroleum resin are obtained.

| Ingredient composition | Embodiment 2 | Embodiment 3 | Embodiment 4 | Embodiment 5 | Embodiment 6 |
|---|---|---|---|---|---|
| MCPD:NBDE | 1:0.1 | 1:0.1 | 1:0.2 | 1:0.4 | 1:0.4 |
| PPG % | 0.5 | 2.0 | 2.0 | 0.5 | 2.0 |
| Performance of hydrogenation petroleum resin | | | | | |
| Softening point, ° C. | 140 | 147 | 141 | 126 | 132 |
| Color number, # | 0.3 | 0.3 | 0.4 | 0.4 | 0.3 |
| Mz | 1760 | 1564 | 1055 | 988 | 890 |
| Mw/Mn | 1.33 | 1.29 | 1.38 | 1.58 | 1.45 |

It can be seen from the above embodiments that with the increase of the proportion of NBDE in polymerization ingredients, the softening point and Z average molecular weight (Mz) of the hydrogenation petroleum resin show a decreasing trend. The increase of the regulator PPG content is helpful to reduce the Mz and the molecular weight distribution Mw/Mn. Since the ingredient raw materials are purified, the correlation between the color number of the hydrogenation petroleum resin and the ingredients is low.

Embodiment 7

(1) MCPD is mixed with NBDE uniformly according to a mass ratio of 1:0.3 as a polymerization raw material, and then PTHF with 1.5% of a total material mass is added. First, methyl cyclohexane accounting for 50% of the total material mass is put into a stirred high-pressure reactor R101, a polymerization reaction is performed at 235° C. for 10 h, and then the polymerization reaction is performed in a stirred high-pressure reactor R102 at 250° C. for 10 h to obtain a polymerization liquid.

(2) Unreacted raw materials are removed from the above polymerization liquid in a flash tank V101 at a pressure of 0.075 MPa and a temperature of 73° C., after passing through an adsorption packing tower T201, a supplementary heavy hydrogenated naphthenic oil is mixed and transported to a loop hydrogenation reactor R201, it reacts with $H_2$ at 140° C. under an action of a powder nickel-supported catalyst with a liquid hourly space velocity of 0.5 $h^{-1}$, and a mixture of a hydrogenation resin liquid A and a catalyst is obtained.

(3) The above mixture passes through a filter F201, the powder nickel-supported catalyst is separated from a bottom, a material at a top is transported to a packing tower T202, after adsorbing and removing impurities such as catalyst powder, it enters a hydrogenation reactor R202, and reacts with $H_2$ at 200° C. under an action of a Ni—Mo/γ-$Al_2O_3$ catalyst with a liquid hourly space velocity of 5 $h^{-1}$, and a hydrogenation resin liquid B is obtained. The powder nickel-supported catalyst removed by the filter is mixed with the supplementary heavy hydrogenated naphthenic oil, and then heated to 160° C. by a heat exchanger E201 before returning to the R201.

(4) The above hydrogenation resin liquid B is transported to a flash tank V301, a solvent is removed by flashing at a vacuum degree of −0.085 MPa and a temperature of 230° C., a hydrogenation resin liquid C obtained at a bottom is transported to a distillation tower T301, then low-boiling-point light components and residual solvents are removed by distillation at the vacuum degree of −0.085 MPa and the temperature of 245° C., and high-softening-point aliphatic hydrogenation petroleum resin with a softening point of 134° C., Gardner color number of 0.9 #, Mz=1460, and Mw/Mn=1.55 is obtained at a tower bottom.

Embodiments 8-11

In Embodiments 8-11, aliphatic hydrogenation petroleum resin with different performances is obtained by adopting the ingredients and polymerization reaction conditions and adjusting two-stage hydrogenation process conditions in Embodiment 7.

|  |  | Embodiment 8 | Embodiment 9 | Embodiment 10 | Embodiment 11 |
|---|---|---|---|---|---|
| First stage | Temperature, ° C. | 160 | 160 | 180 | 180 |
|  | Liquid hourly space velocity, h$^{-1}$ | 0.5 | 0.3 | 0.5 | 0.3 |
| Second stage | Temperature, ° C. | 220 | 220 | 240 | 240 |
|  | Liquid hourly space velocity, h$^{-1}$ | 5 | 2.5 | 5 | 2.5 |
|  | Softening point, ° C. | 132 | 130 | 129 | 127 |
|  | Color number, # | 0.6 | 0.3 | 0.2 | 0.1 |
|  | Mz | 1406 | 1412 | 1386 | 1355 |
|  | Mw/Mn | 1.53 | 1.51 | 1.50 | 1.48 |

It can be seen from the above embodiments that with the increase of hydrogenation reaction problem and the reduction of the liquid hourly space velocity, the hydrogenation degree of aliphatic hydrogenation petroleum resin continues to increase, the softening point and the color number decrease obviously, but the Z average molecular weight and molecular weight distribution index of the resin do not change obviously.

Embodiment 12

(1) CPD, MCPD and VCH are mixed with 1,3-CHD uniformly according to a mass ratio of 1:1:0.15:0.15 as a polymerization raw material, and then PTHF with 1.5% of a total material mass is added. First, methyl cyclohexane accounting for 50% of the total material mass is put into a stirred high-pressure reactor R101, a polymerization reaction is performed at 235° C. for 10 h, and then the polymerization reaction is performed in a stirred high-pressure reactor R102 at 247° C. for 12 h to obtain a polymerization liquid.

(2) Unreacted raw materials are removed from the above polymerization liquid in a flash tank V101 at a pressure of 0.075 MPa and a temperature of 73° C., after passing through an adsorption packing tower T201, a supplementary heavy hydrogenated naphthenic oil is mixed and transported to a loop hydrogenation reactor R201, it reacts with H$_2$ at 140° C. under an action of a powder nickel-supported catalyst with a liquid hourly space velocity of 0.5 h$^{-1}$, and a mixture of a hydrogenation resin liquid A and a catalyst is obtained.

(3) The above mixture passes through a filter F201, the powder nickel-supported catalyst is separated from a bottom, a material at a top is transported to a packing tower T202, after adsorbing and removing impurities such as catalyst powder, it enters a hydrogenation reactor R202, and reacts with H$_2$ at 200° C. under an action of a Ni—Mo/γ-Al$_2$O$_3$ catalyst with a liquid hourly space velocity of 5 h$^{-1}$, and a hydrogenation resin liquid B is obtained. The powder nickel-supported catalyst removed by the filter is mixed with the supplementary heavy hydrogenated naphthenic oil, and then heated to 160° C. by a heat exchanger E201 before returning to the R201.

(4) The above hydrogenation resin liquid B is transported to a flash tank V301, a solvent is removed by flashing at a vacuum degree of −0.085 MPa and a temperature of 230° C., a hydrogenation resin liquid C obtained at a bottom is transported to a distillation tower T301, then low-boiling-point light components and residual solvents are removed by distillation at the vacuum degree of −0.085 MPa and the temperature of 245° C., and high-softening-point aliphatic hydrogenation petroleum resin with a softening point of 142° C., Gardner color number of 0.3 #, Mz=1670, and Mw/Mn=1.61 is obtained at a tower bottom.

Embodiment 13

The hydrogenation petroleum resin prepared in Embodiment 7 and Embodiment 11 is used as a raw material respectively, and extruded with homo-polypropylene (MI=6 g/10 min, a shrinking rate is 1.6%, and Rockwell hardness is 76) by a twin-screw extruder (an extrusion temperature is 260° C., and a melt temperature is 240° C.) according to a mass ratio of 1:1, an antioxidant BHT with about 0.3% of a total material mass is added, and a BOPP stiffening agent is obtained by granulation and cooling. The performance comparison is as follows:

| Performance of a stiffening agent | I | II |
|---|---|---|
| Tensile elastic modulus, MPa | 1930 | 2180 |
| Volatile organic compound (VOC), g/L | 0.4 | 0.7 |

Note:
The stiffening agents I and II are extruded samples of blending homopolymer PP with Embodiments 7 and 11.

It can be seen from the above embodiments that the stiffening agent formed by extrusion of the hydrogenation resin with higher softening point and higher Mz molecular weight and the PP has smaller tensile elastic modulus. The smaller the stiffness of the modified BOPP film, the better the flexibility, and the easier the stretch molding.

What is claimed is:

1. A preparation method of a BOPP film stiffening agent, comprising:
    step (1) mixing cyclopentadiene or a derivative thereof with a norbornene monomer or C8 cycloolefin uniformly according to a mass ratio of 1:(0.1-0.5) as a polymerization raw material, and then adding polyether polyol with 0.05-5.0% of a total material mass;
    and first, putting a reaction solvent accounting for 30-60% of the total material mass into a first stirred high-pressure reactor (R101), performing a polymerization reaction at 220-250° C. for 10-20 h, and then performing the polymerization reaction in a second stirred high-pressure reactor (R102) at 240-270° C. for 10-20 h to obtain a polymerization liquid;
    step (2) removing unreacted raw materials from the polymerization liquid obtained in step (1) in a first flash tank (V101) at a pressure of 0.07-0.08 MPa and a temperature of 70-75° C.; after passing through an adsorption packing tower (T201), mixing the materials with a supplementary solvent and transporting to a loop hydrogenation reactor (R201); and subjecting the materials to a reaction with $H_2$ at 140-180° C. under an action of a powder nickel-supported catalyst with a liquid hourly space velocity of 0.3-0.5 $h^{-1}$, and obtaining a mixture of a hydrogenation resin liquid A and a catalyst;
    step (3) throwing the mixture obtained in step (2) into a filter (F201), separating the powder nickel-supported catalyst from a bottom, transporting a material at a top to a packing tower (T202), and after adsorbing and removing impurities, throwing the materials into a hydrogenation reactor (R202), subjecting the same to a reaction with $H_2$ at 190-240° C. under an action of a Ni—Mo/$\gamma$-$Al_2O_3$ catalyst with a liquid hourly space velocity of 2-5 $h^{-1}$, and obtaining a hydrogenation resin liquid B; and mixing the removed powder nickel-supported catalyst with the supplementary solvent, and then heating to 130-160° C. by a heat exchanger (E201) before returning to the loop hydrogenation reactor (R201);
    step (4) transporting the hydrogenation resin liquid B obtained in step (3) to a second flash tank (V301), removing a solvent at a vacuum degree of −0.085 MPa to −0.095 MPa and a temperature of 200-250° C., transporting a hydrogenation resin liquid C obtained at a bottom to a distillation tower (T301), removing low-boiling-point light components and residual solvents by distillation at the vacuum degree of −0.085 MPa to −0.095 MPa and the temperature of 200-250° C., and obtaining high-softening-point aliphatic hydrogenation petroleum resin at a tower bottom; and
    step (5) extruding the high-softening-point aliphatic hydrogenation petroleum resin obtained in step (4) and homo-polypropylene by a twin-screw extruder according to a mass ratio of 1:1, at the same time, adding an antioxidant, and then obtaining the BOPP film stiffening agent by granulation and cooling.

2. The preparation method of claim 1, wherein the cyclopentadiene or the derivative thereof in step (1) is one or a mixture of the cyclopentadiene, methyl cyclopentadiene, ethyl cyclopentadiene, dicyclopentadiene and methyl cyclopentadiene dimer.

3. The preparation method of claim 1, wherein the norbornene monomer in step (1) is one or a mixture of 2,5-norbornadiene and 5-ethylene-2-norbornene; and the C8 cycloolefin is one or a mixture of 5-vinyl-2-cyclohexene and 1,3-cyclohexadiene.

4. The preparation method of claim 1, wherein the polyether polyol in step (1) is propylene glycol polyether (PPG) or polytetrahydrofuran glycol (PTHF).

5. The preparation method of claim 1, wherein the reaction solvent in step (1) is one or more of cyclohexane, methyl cyclohexane, cyclopentane and hydrogenated naphthenic oil.

6. The preparation method of claim 1, wherein the supplementary solvent in step (2) and step (3) is heavy hydrogenated naphthenic oil.

7. The preparation method of claim 1, wherein a content of Ni in the powder nickel-supported catalyst in step (2) is 60-70%, a carrier is silica, an average particle size is 15-50 μm, and a specific surface area is 150-220 $m^2$/g.

8. The preparation method of claim 1, wherein the Ni—Mo/$\gamma$-$Al_2O_3$ catalyst in step (3) is prepared by an impregnation method, a loading content of Ni is 15-35%, a loading content of Mo is 1-3%, and a size is Φ5x(4-6) mm.

9. The preparation method of claim 1, wherein a setting temperature of the twin-screw extruder in step (5) is 250-260° C., and a melt temperature is 235-245° C.

10. The preparation method of claim 1, wherein the antioxidant in step (5) is an antioxidant BHT, and an added amount is 0.3%-0.4% of the total material mass.

* * * * *